Dec. 12, 1950
J. F. BRINSTER ET AL
SIGNAL CONVERTER FOR MULTISIGNAL
TRANSMISSION SYSTEMS
2,533,552
Filed Nov. 21, 1945
3 Sheets-Sheet 1

Inventors:
John F. Brinster
Jack Larson
By
Pierce & Scheffler
Attorneys.

Inventors:
John F. Brinster
Jack Larsen
By
Pierce & Scheffler
Attorneys.

Inventors:
John F. Brinster
Jack Larsen

Pierce + Scheffler
Attorneys.

Patented Dec. 12, 1950 2,533,552

UNITED STATES PATENT OFFICE 2,533,552

SIGNAL CONVERTER FOR MULTISIGNAL TRANSMISSION SYSTEMS

John F. Brinster, Princeton, N. J., and Jack Larsen, Jackson, Mich., assignors to Research Corporation, New York, N. Y., a corporation of New York Application November 21, 1945, Serial No. 630,080

2 Claims. (Cl. 250—27)

This invention relates to a multi-signal transmission system and particularly to apparatus for the modulation of pulses in accordance with signals to be transmitted.

An object of the invention is the provision of a pulse modulator adapted for use in a system for the transmission of a plurality of intelligence signals over a single output channel.

Another object of the invention is the provision of a system for the transmission of a plurality of signals over a single channel including means for cyclically modulating the output signal with a plurality of intelligence signals.

Other objects and advantages of the invention will appear from the following description.

The apparatus of the invention is particularly useful in systems for transmitting data, such as instrument reading, strain gauge and accelerometer readings and the like, to ground stations for recording and, for the purpose of illustrating the principles of the invention, the invention will be more particularly described with reference to a system for the telemetering of aircraft flight data from a plurality of instruments to a ground station, more fully described in application Serial No. 625,590, filed October 30, 1945, Myron H. Nichols et al., "Multisignal Transmission System," now U. S. Patent 2,444,950, issued July 13, 1948.

The transmission system of the invention includes an electronic commutator adapted to connect in cyclic serial order a plurality of intelligence channels with a single output channel for radio transmission to a receiver which may include a similar commutator adapted to connect the received signals in corresponding cyclic serial order to a plurality of indicating and/or recording devices.

The specific characteristics of the transmission system are largely governed by the number and character of the signals to be transmitted. Each signal must be sampled at a rate high enough to detect variations in the signal. In general, the sampling rate in samples per second must be somewhat greater than two times the highest frequency to be reproduced. With a signal sampling rate of F times per second and a number of signal channels $n$, the switching speed must be $nF$ times per second. When high switching speeds are required, mechanical commutation becomes inadequate. In order to provide effectively high switching speeds, the transmission system of the invention is provided with an electronic commutator comprising a plurality of electronic tube switch circuits corresponding in number to the signal channels to be sampled, the first switch circuit of the commutator being actuated by a master pulse at the beginning of each switching cycle and the successive switch circuits being actuated by switching pulses corresponding to the number of the signal channels.

The periodic pulses are passed from each of the switch circuits of the commutator to a modulator of the invention whereby the corresponding intelligence channel is connected with the common transmission channel of the system during the duration of a pulse, thereby, in effect, modulating each pulse with the intelligence signal. The modulator or converter of the invention comprises a triode, to the plate of which an intelligence signal is applied and to the grid of which periodic positive pulses are applied whereby the intelligence signal is passed by the triode for the duration of the pulse. In an advantageous form, the invention comprises a double triode or its equivalent in which the intelligence signal is applied to the grid of one of the triodes, the cathode of which drives the plate of the other triode. By applying a positive pulse to the grid of the other triode through a limiting resistance, the triode becomes a resistance of finite value for the duration of the pulse and passes the intelligence signal applied to the plate thereof.

The invention will be more particularly described with reference to the accompanying drawings showing an illustrative embodiment of the invention.

*The transmission system*

Figure 1:
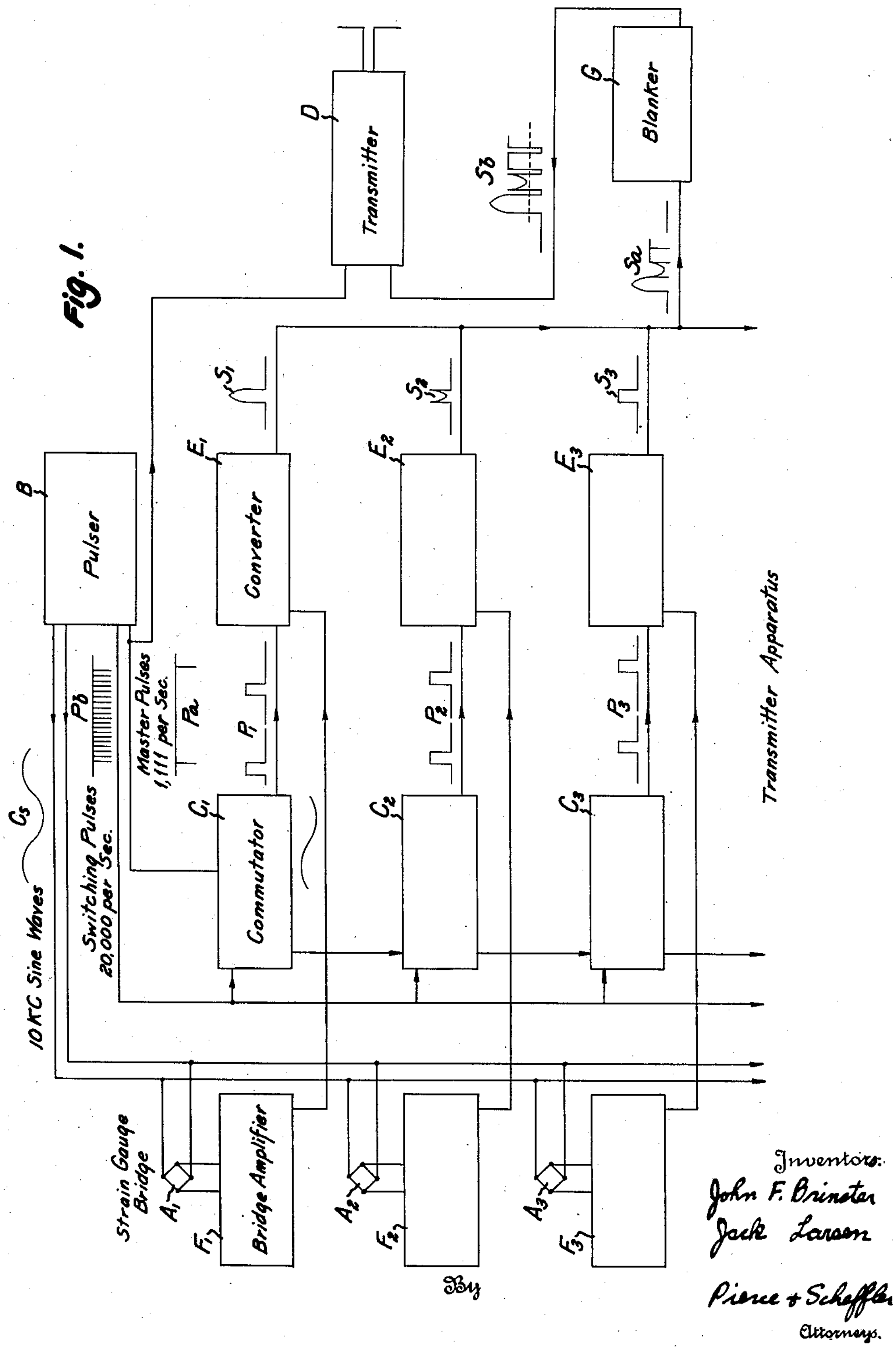
Fig. 1 is a block diagram of a multi-signal transmitter embodying the signal converter of the invention.

A typical airborne transmission system is shown diagrammatically in Fig. 1. It operates at a sampling frequency F of 1111 per second. Eighteen signal channels, $n$, are provided for transmission of signals from eighteen strain gauge bridges $A_1$, $A_2$ . . . distributed at critical points on the aircraft. The switching frequency or pulse frequency, $Fn$, is therefore 20,000 per second.

The pulse generator B provides a 10 kc. sine wave Cs to drive the strain gauge bridges. It also provides master pulses Pa at 1111 per second which are fed to the first switch circuit $C_1$ of the commutator, as well as to the transmitter D, and switching pulses Pb at 20,000 per second which are fed to the commutator switch circuits $C_1$, $C_2$ . . .

Figures 3, 4:
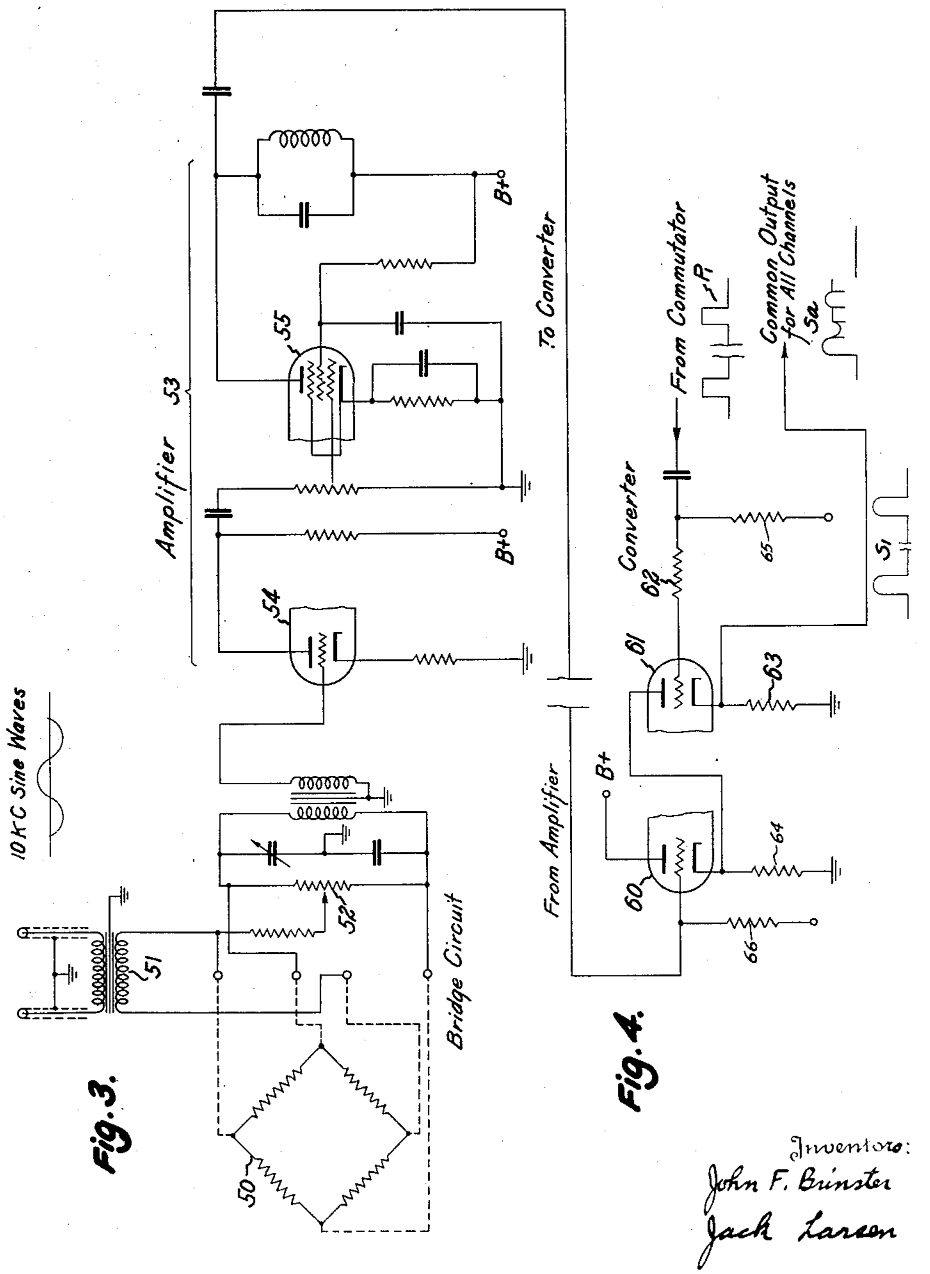
Fig. 3 is a circuit diagram of the bridge circuit and amplifier of the system of Fig. 1.
Fig. 4 is a circuit diagram of the signal converter or modulator of the invention.

Corresponding to each strain gauge bridge there is a converter circuit $E_1$ $E_2$ . . . , shown in detail in Fig. 4, to which the segregated signal pulses $P_1$, $P_2$ . . . are fed from the corresponding switch circuits of the commutator at the rate of 1111 per second. The signal from the strain gauge bridges, amplified by the associated amplifiers $F_1$, $F_2$ . . . , are fed to the corresponding converters and emerge as modulated pulses $S_1$, $S_2$ . . . , having a frequency of 1111 per second and a pulse duration of $1/20000$ of a second.

The modulated pulses Sa are fed to the blanker G which broadens and clips the pulses. The modulated pulses Sb are then supplied to the transmitter D.

*The receiving apparatus*

Figure 2:
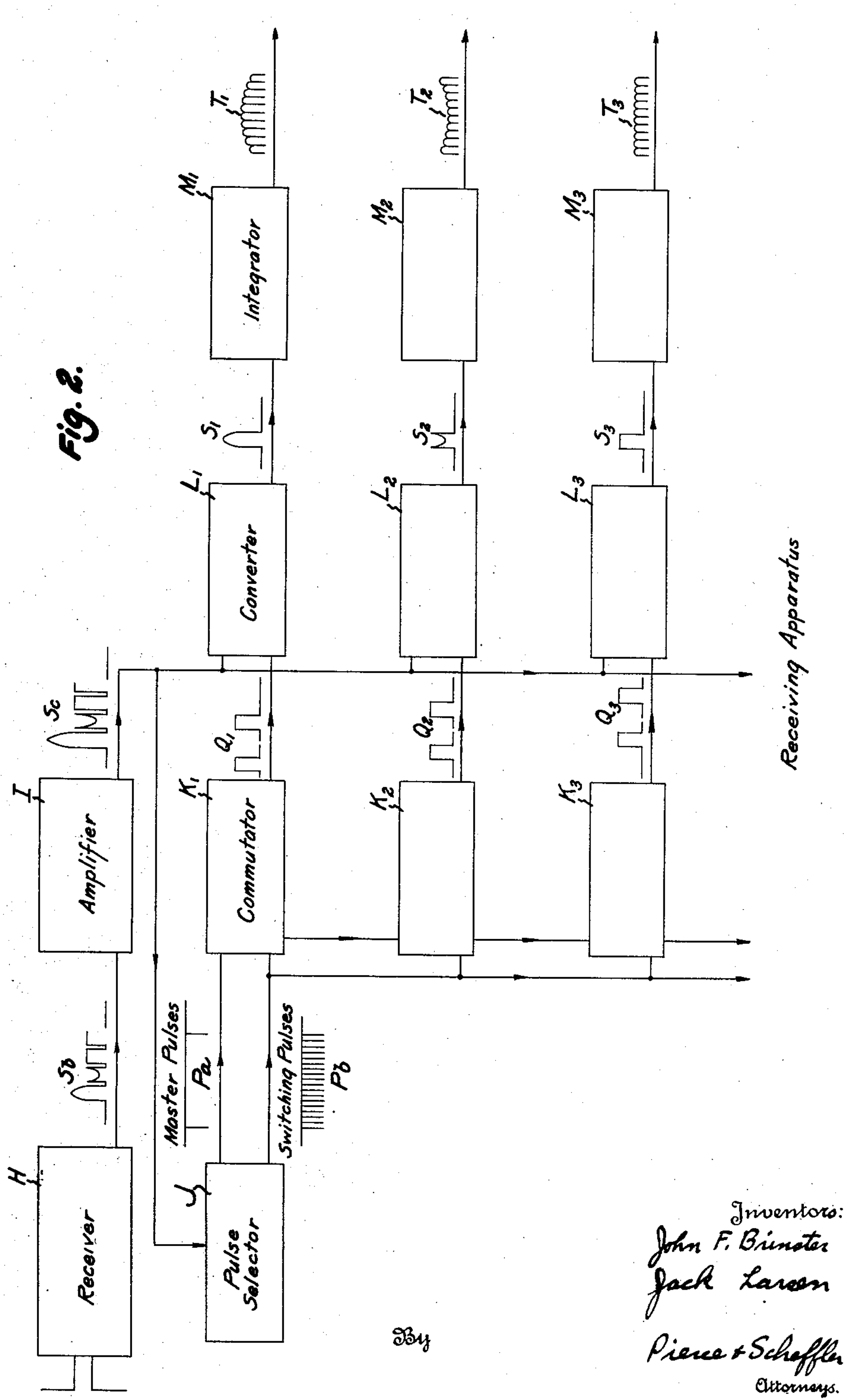
Fig. 2 is a block diagram of a receiving system adapted for receiving and segregating the signals transmitted by the transmitter of Fig. 1.

A suitable form of receiving apparatus is shown in block diagram in Fig. 2. It comprises a receiver H suitable for the reception of the frequency modulated signals transmitted by the transmitter. The received signal Sb taken from the discriminator of the receiver is fed to the amplifier I and to the pulse selector J.

The amplified signal Sc is fed to the converters $L_1$, $L_2$ . . . , which are similar in arrangement and function to the converters described in connection with Fig. 4. The master pulse Pa from the pulse selector is supplied to the first trigger channel $K_1$ of the commutator, while the switching pulses Pb are fed in common to all of the channels of the commutator. The commutator supplies timed pulses $Q_1$, $Q_2$ . . . serially to the converters in synchronism with the individual modulated pulses from the amplifier I. These individual modulated pulses $S_1$, $S_2$ . . . are then fed to corresponding integrators $M_1$, $M_2$ . . .

In the integrators the individual modulated pulses are grouped to form integrated signals $T_1$, $T_2$ . . . , having wave forms corresponding to the variations in the data of the instruments $A_1$, $A_2$ . . . of Fig. 1.

*The bridge circuit*

An illustrative bridge circuit and amplifier is shown in Fig. 3. In the circuit shown, each arm of the strain gauge bridge 50 may be an active gauge. The bridge is driven through a carefully shielded transformer 51. A potentiometer 52 provides for initial bridge balancing. The bridge signal is amplified in two-stage tuned amplifier 53 with an overall gain of about ten thousand, controlled by a driven between the diode 54 and the pentode 55.

*The converter*

The output of the bridge amplifier is fed into the corresponding converter or modulator as shown in Fig. 4. In the embodiment shown in this figure, the converter comprises a double triode. The intelligence signal from the bridge amplifier is applied to the grid of the first triode unit 60, the cathode of which is connected to the plate of the second triode unit 61, whereby the first triode acts as a cathode follower driving the plate of the second triode. The positive signal pulses $P_1$ from the corresponding commutator channel are applied to the grid of the second triode through resistance 62.

The cathode circuit of triode 60 is completed through resistor 64 and also through the effective parallel path comprising the plate-cathode circuit of triode 61 and series cathode resistor 63. Triode 61 is normally biased to plate current cut-off by a suitable negative voltage applied through resistor 65, but triode 61 does conduct plate current for predetermined periods when signal pulses $P_1$ are applied to its grid through current limiting resistor 62. A grid voltage, which may be positive with respect to chassis ground, derived from a suitable source is applied to the grid of triode 60 through resistor 66. The cathode of triode 60 and the plate of triode 61 have the same D. C. potential which is positive with respect to chassis ground, and this D. C. working potential may be established at a desired level by control of the grid voltage applied to triode 60.

The positive signal pulse $P_1$ tends to drive the grid of triode 61 positive but the grid resistance 62 limits it to only a slightly positive value relative to the cathode. The tube thus acts simply as a resistance of finite value when the positive pulses occur but of very large value at other times. The cathode resistor 63 of triode unit 61 is common to all channels and forms the common output to which all the channels feed the consecutive modulated signal pulses $S_1$, $S_2$ . . . for the radio transmission.

In the specific embodiment of the invention shown in the figures, the duration of the positive pulses $P_1$, $P_2$ . . . from the converter is exactly one-half the period of the 10,000 cycle bridge driving frequency, and the pulses are phased so that the sampling starts when the bridge driving voltage is passing through zero and stops when the voltage is again passing through zero a half period later. Thus, the bridge signal is sampled for half a cycle every eighteenth cycle. Other relations of the commutator pulse to the instrument signal may be used effectively. By making the commutator pulse duration equal to the period of the instrument signal, a complete cycle is sampled. If the number of channels is odd instead of even, alternate or "up and down" sampling results. This has the advantage of not introducing D. C. components into the signal to be transmitted.

We claim:

1. In a multi-signal transmission system including an intelligence signal generator, means for sampling the intelligence signal from said generator at a definite frequency and for a preselected time interval less than said frequency comprising a timing signal generator providing periodic positive timing pulses having a frequency equal to the frequency at which said intelligence signal generator is to be sampled and having a duration substantially equal to the desired duration of the sample, first and second electron tubes each having a cathode, a control grid and an anode element, a resistive element between each tube cathode and reference ground, means for applying a positive working voltage between the anode of the first tube and reference ground, conductor means connecting the cathode of the first tube to the anode of the second tube, circuit means for applying the signal from said intelligence signal generator to the grid of the first tube, circuit means for applying the periodic positive timing pulses to the grid of the second tube, and output circuit means connected across at least a part of the cathode resistive element of the second tube.

2. In a multi-signal transmission system including an intelligence signal generator, means for sampling the intelligence signal from said generator at a definite frequency and for a preselected time interval less than said frequency comprising a timing signal generator providing periodic positive timing pulses having a frequency equal to the frequency at which said intelligence signal generator is to be sampled and having a duration substantially equal to the desired duration of the sample, first and second electron tubes each having a cathode, a control grid and an anode element, a resistive element between each tube cathode and reference ground, means for applying a positive working voltage between the anode of the first tube and reference ground, conductor means connecting the cathode of the first tube to the anode of the second tube, circuit means for applying the signal from said intelligence signal generator to the grid of the first tube, circuit means including a grid current limiting resistor for applying the periodic positive timing pulses to the grid of the second tube, and output circuit means connected across at least a part of the cathode resistive element of the second tube.

JOHN F. BRINSTER.
JACK LARSEN.

REFERENCES CITED

The following references are of record in the file of this patent:

UNITED STATES PATENTS

| Number | Name | Date |
|---|---|---|
| 1,687,882 | Nichols | Oct. 16, 1928 |
| 1,906,627 | Kummerer | May 2, 1933 |
| 1,928,093 | Coyle | Sept. 26, 1933 |
| 1,942,457 | Summers | Jan. 9, 1934 |
| 1,991,027 | O'Donovan et al. | Feb. 12, 1935 |
| 2,015,523 | Ilberg | Sept. 24, 1935 |
| 2,048,081 | Riggs | July 21, 1936 |
| 2,389,646 | Sleeper | Nov. 27, 1945 |
| 2,440,049 | Houghton | Apr. 20, 1948 |

OTHER REFERENCES

Brainerd, "Ultra High Frequency Techniques," D. Van Nostrand Co., Inc., New York, N. Y. Eleventh printing, May 24, 1943, pages 222, 223.

"Electronic Industries," May 1945, pages 216, 218.